(12) United States Patent
Kimura

(10) Patent No.: US 6,419,585 B1
(45) Date of Patent: Jul. 16, 2002

(54) POWER TRANSMISSION MECHANISM

(75) Inventor: Kazuya Kimura, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/601,639

(22) PCT Filed: Dec. 2, 1999

(86) PCT No.: PCT/JP99/06762

§ 371 (c)(1),
(2), (4) Date: Aug. 4, 2000

(87) PCT Pub. No.: WO00/34688

PCT Pub. Date: Jun. 15, 2000

(30) Foreign Application Priority Data

Dec. 4, 1999 (JP) .......................... 10-345658

(51) Int. Cl.$^7$ .............................. F04B 9/00; F16D 9/08
(52) U.S. Cl. ............................ 464/32; 417/319; 464/77
(58) Field of Search ................. 464/32, 30, 33, 464/51, 54, 57, 77, 185; 417/223, 319

(56) References Cited

U.S. PATENT DOCUMENTS

| | | | |
|---|---|---|---|
| 1,334,557 A | * 3/1920 | Ruff | 464/51 |
| 1,498,281 A | * 6/1924 | Jones | 464/32 |
| 1,673,959 A | * 6/1928 | Wallgren | 464/51 |
| 3,246,485 A | * 4/1966 | Chapman | 464/51 |
| 4,097,161 A | 6/1978 | Weiss et al. | 403/2 |
| 4,859,156 A | * 8/1989 | Kikuchi | 464/32 |
| 5,443,372 A | * 8/1995 | Kanoll | 464/32 |
| 6,068,452 A | * 5/2000 | Okada et al. | 464/32 |

FOREIGN PATENT DOCUMENTS

| | | |
|---|---|---|
| EP | 0 867 631 A1 | 9/1998 |
| JP | 8-232838 | 9/1996 |
| JP | 8-319945 | 12/1996 |

\* cited by examiner

Primary Examiner—Lynne H. Browne
Assistant Examiner—Kenn Thompson
(74) Attorney, Agent, or Firm—Morgan & Finnegan, LLP

(57) ABSTRACT

An interruptible power transmission mechanism couples a drive source to a compressor. The power transmission mechanism has a pulley, which rotates in synchronism with the drive source, and a receiving member, which rotates in synchronism with the compressor. A limit spring couples the pulley and the receiving member such that they rotate together. When the load torque of the compressor exceeds a predetermined value, the diameter of the limit spring is decreased so that the limit spring engages a rib provided on the receiving member. Then, the deformation of the limit spring in the radial direction is locally restricted, causing stress at a specific portion of the limit spring to increase rapidly. As a result, the limit spring is reliably broken at a torque near the desired load torque, thus interrupting power in a desirable manner.

15 Claims, 5 Drawing Sheets

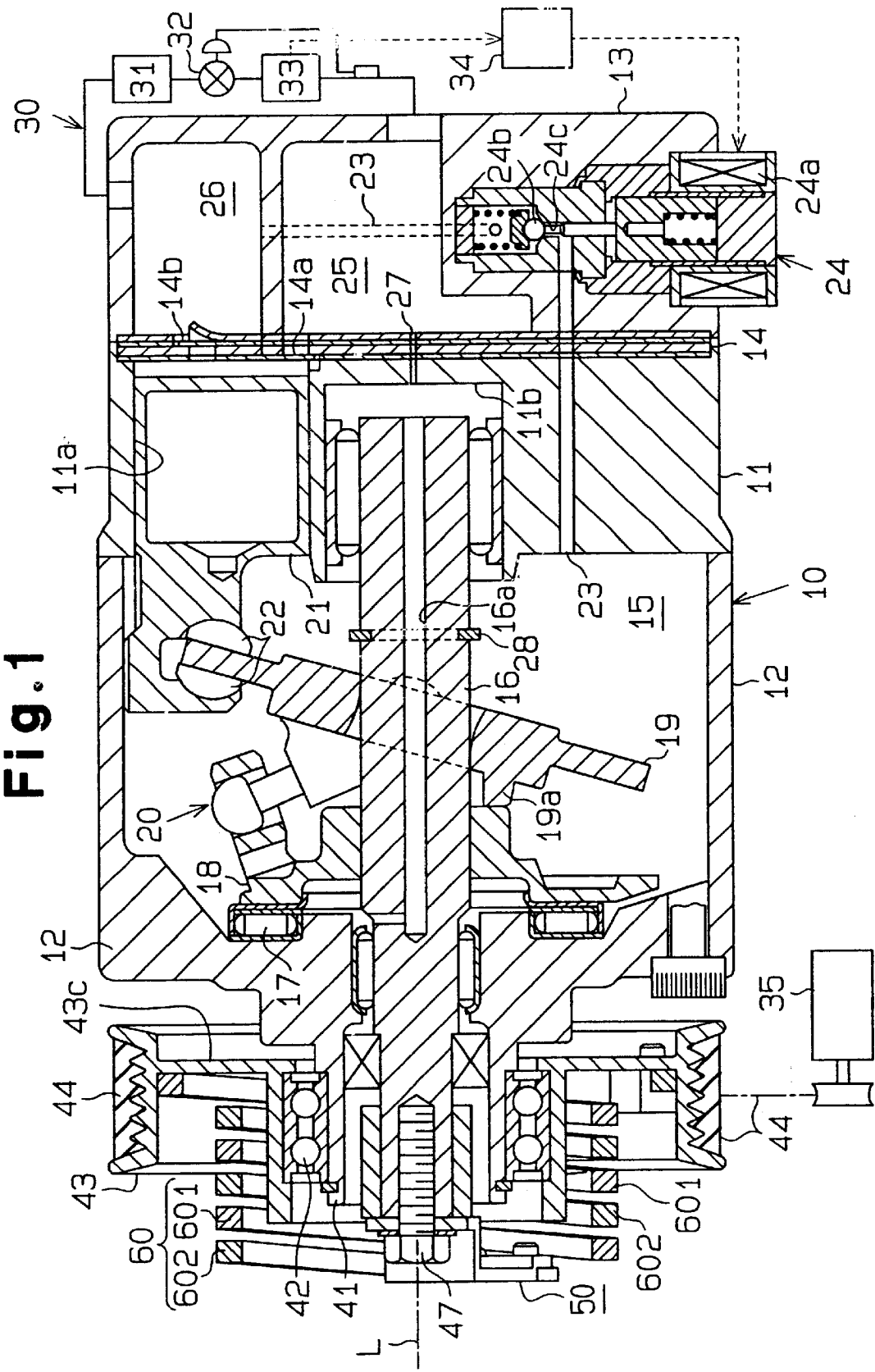

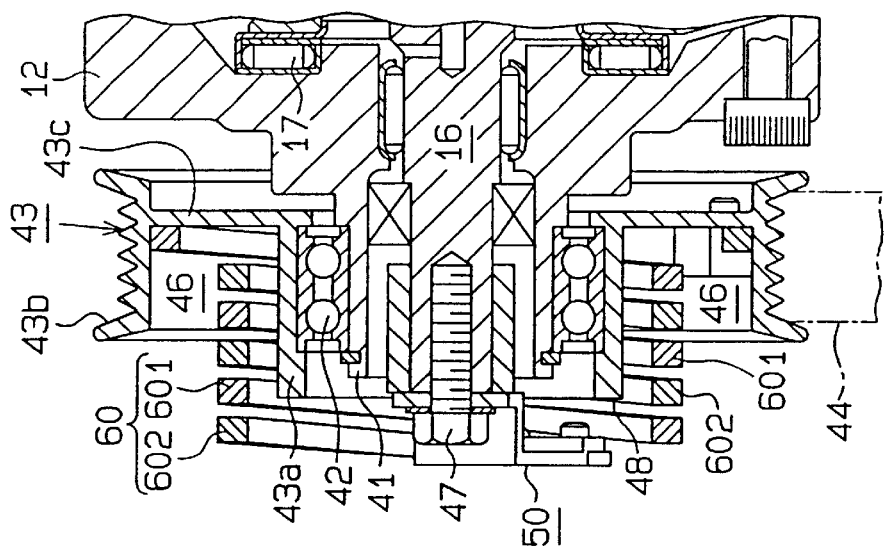
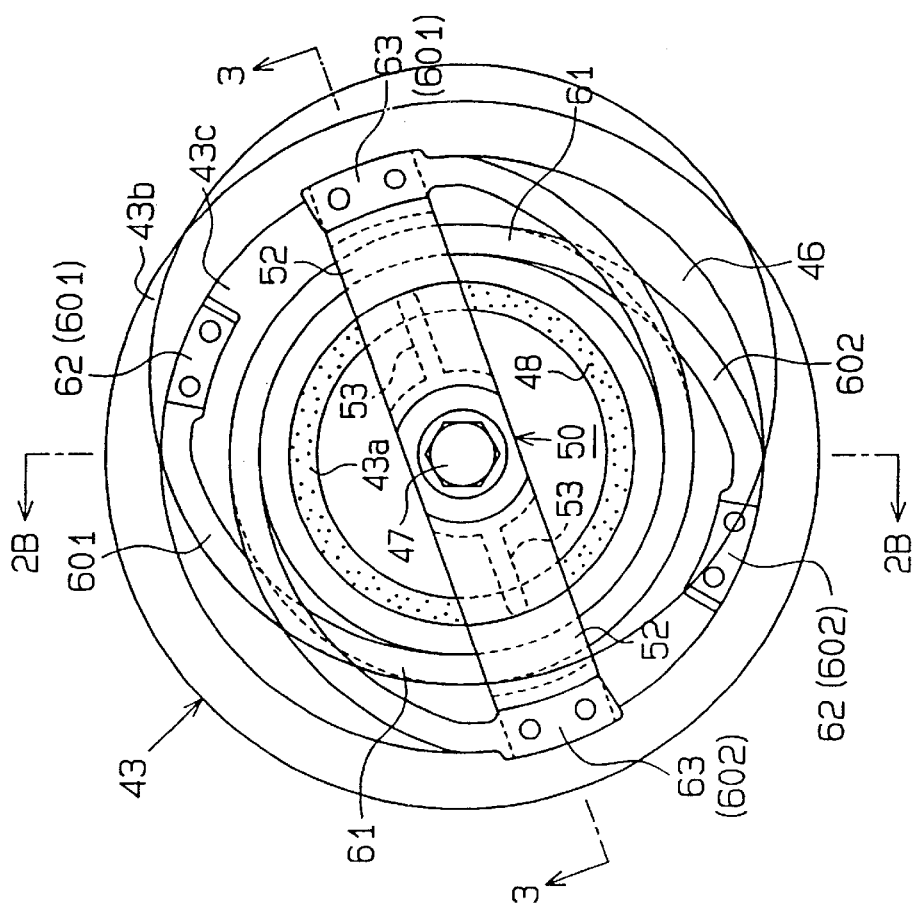

Fig.3
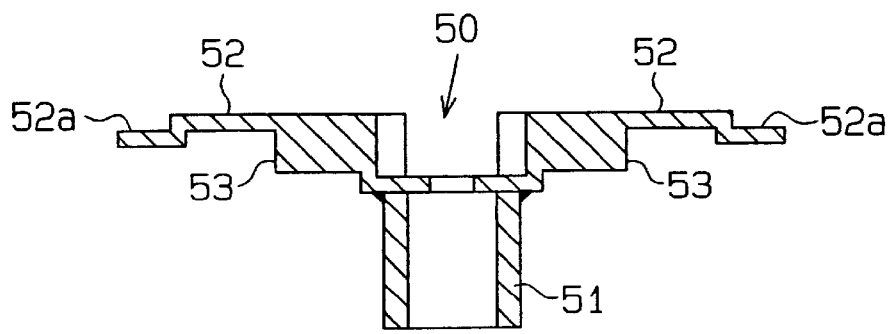
Fig.4(A)      Fig.4(B)
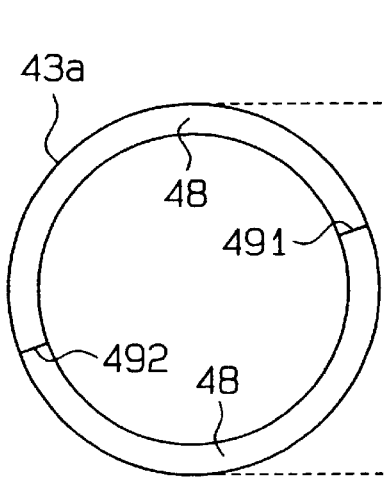
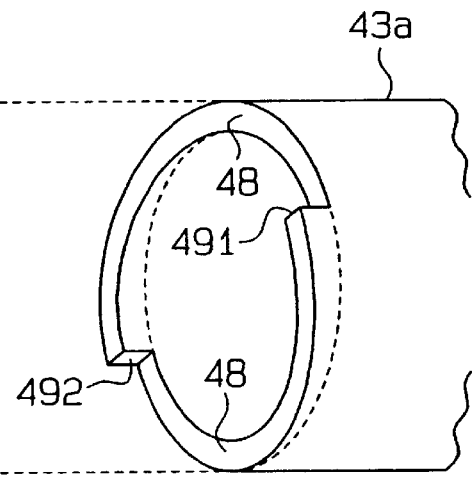

POWER TRANSMISSION MECHANISM

BACKGROUND OF THE INVENTION

The present invention relates to a power transmission mechanism provided between a drive source and a driven machine. More specifically, this invention relates to a power transmission mechanism that interrupts transmission between a drive source and a driven machine when an excess load torque is produced by the driven machine.

In general, a power transmission mechanism is provided between a drive source, such as an engine or a motor, and a driven machine, such as a compressor. When an abnormality (e.g., seizure) occurs in the driven machine, the power transmission mechanism positively shuts off power transmission between the drive source and the driven machine to prevent the excess load torque from affecting the drive source.

For example, Japanese Unexamined Patent Publication (KOKAI) Hei No. 8-319945 discloses a clutchless compressor in which a pulley, which is fitted over the end portion of the rotary shaft, is driven by an engine. The pulley, or power transmission mechanism, has a plurality of arcuate holes arranged at predetermined intervals on an imaginary circle about the axis of the rotary shaft. The portions between adjacent pairs of holes form break portions. When the rotary shaft is unable to rotate due to an abnormality in the internal mechanism of the compressor and a load torque equal to or greater than a predetermined value acts on the break portion, the break portion breaks. Consequently, the power transmission to the rotary shaft from the engine is cut off.

According to the power transmission mechanism of the aforementioned publication, the break portion does not always fully break when the load torque reaches the predetermined value. Specifically, for example, the failure stresses of the individual members, if they are of the same kind or are the same member, are not quite the same and have a certain variation. It is therefore actually very hard to reliably break the break portion in the vicinity of a load torque where breaking is expected in individual power transmission mechanisms that have such individual differences. Accordingly, a simple structure that has a break portion merely provided at a part of the pulley is not practical, and there is no guarantee that breakage will occur as expected.

SUMMARY OF THE INVENTION

It is therefore an object of the present invention to provide a power transmission mechanism that reliably breaks in the vicinity of a desired load torque to accomplish suitable power cutoff.

To achieve the above object, this invention provides a power transmission mechanism for coupling a drive source to a driven machine in an interruptible manner. The power transmission mechanism includes a first rotary body, which rotates in synchronism with the drive source, and a second rotary body, which rotates in synchronism with the driven machine. Coupling means couples the first rotary body and the second rotary body in a synchronously rotatable manner. Engagement means engages with the coupling means when the load torque of the driven machine exceeds a predetermined value. The engagement means, which is in engagement with the coupling means, increases stress at a specific portion of the coupling means to break the coupling means.

A power transmission mechanism provided according to another aspect of this invention includes a first rotary body, which rotates in synchronism with the drive source, and a second rotary body, which rotates in synchronism with the driven machine. Coupling means couples the first rotary body and the second rotary body in a synchronously rotatable manner. As the load torque of the driven machine increases, the stress of the coupling means increases. Engagement means engages with the coupling means to increase the ratio of the change in the stress of the coupling means to the change in the load torque of the driven machine. The engagement means engages with the coupling means to break the coupling means when the load torque of the driven machine exceeds a predetermined value.

BRIEF DESCRIPTION OF THE SEVERAL VIEWS OF THE DRAWINGS

FIG. 1 is a cross-sectional view of a variable displacement compressor according to one embodiment of the present invention;

FIG. 2(A) is a front view of a power transmission mechanism equipped in the compressor in FIG. 1;

FIG. 2(B) is a cross-sectional view taken along the line 2B—2B in FIG. 2(A);

FIG. 3 is a cross-sectional view of a receiving member taken along the line 3—3 in FIG. 2(A);

FIG. 4(A) is a front view of a boss of a pulley;

FIG. 4(B) is a perspective view of the boss of the pulley;

DETAILED DESCRIPTION OF THE PREFERRED EMBODIMENTS

Figure 5:
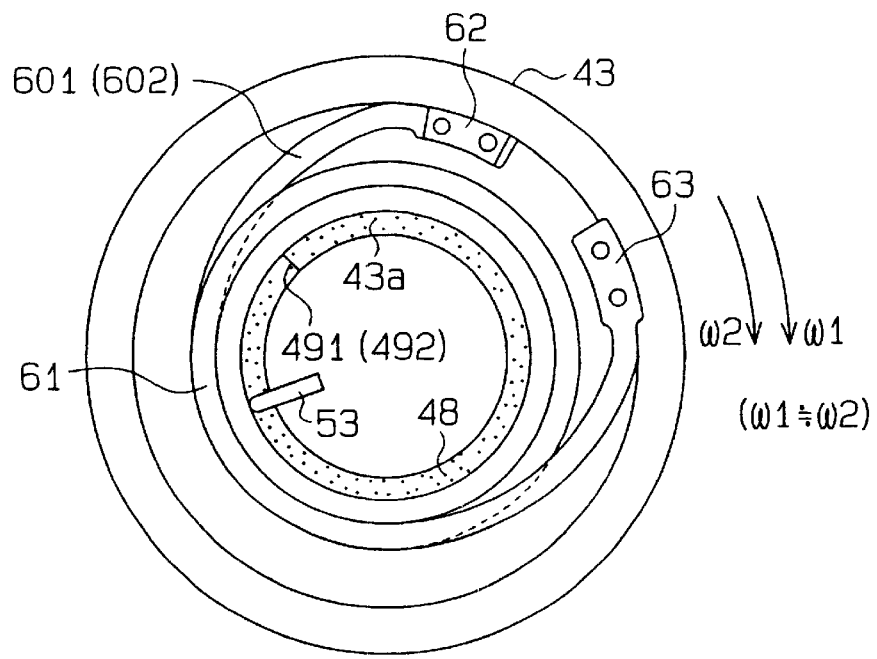
FIG. 5 is an explanatory diagram showing the state of a coil spring in a power transmitting state.

One embodiment of the present invention, as embodied in a variable displacement compressor of an air-conditioning system for a vehicle, will now be described with reference to FIGS. 1 through 7. The compressor in this embodiment is called a clutchless compressor because it does not require a clutch mechanism, such as an electromagnetic clutch, between itself and an engine, or drive source. A power transmission mechanism according to this invention is used in place of such a clutch mechanism and has two functions, which are power transmission in a normal mode and power cutoff in an emergency mode.

As shown in FIG. 1, the vehicular air-conditioning system comprises a rocking swash plate type variable displacement compressor 10, an external refrigeration circuit 30 and a controller 34, which performs general control of the air-conditioning system. The external refrigeration circuit 30 has, for example, a condenser 31, a temperature type expansion valve 32 and an evaporator 33. The external refrigeration circuit and the compressor 10 constitute a refrigeration cycle.

The compressor 10, or driven machine, has a cylinder block 11, a front housing 12, which is connected to the front end face of the cylinder block 11, a valve plate 14 and a rear housing 13, which is connected to the rear end face of the cylinder block 11 through the valve plate 14. The cylinder block 11, the front housing 12, the rear housing 13 and the valve plate 14 constitute the housing of the compressor 10.

A crank chamber 15 is defined between the front housing 12 and the cylinder block 11. A drive shaft 16 is rotatably supported by the front housing 12 and the cylinder block 11. In the crank chamber 15, a lug plate 18 is fixed to the drive shaft 16. The lug plate 16 contacts the inner wall of the front housing 12 via a thrust bearing 17. A swash plate 19 as a drive plate is supported in the crank chamber 15 by the drive shaft 16 such that the swash plate 19 can tilt and slide in the axial direction. The swash plate 19 is coupled to the lug plate 18 via a hinge mechanism 20. The lug plate 18 and the hinge mechanism 20 allow the swash plate 19 to slide and tilt with respect to the drive shaft 16 and rotate integrally with the drive shaft 16.

A plurality of cylinder bores 11a (only one shown in FIG. 1) are located in the cylinder block 11. The cylinder bores 11a are provided at equal intervals on a circle centered on axial line L of the drive shaft 16. A one-headed piston 21 is retained in each cylinder bore 11a in a reciprocatable manner. One end of each piston 21 is coupled to the peripheral portion of the swash plate via a pair of shoes 22. In each cylinder bore 11a, a compression chamber is defined between the end face of the piston 21 and the valve plate 14. As the drive shaft 16 rotates, the swash plate 19 rotates and each piston 21 reciprocates in the cylinder bore 11a.

A suction chamber 25 and a discharge chamber 26 are defined in the rear housing 13. The suction chamber 25 and the discharge chamber 26 are connected together by the external refrigeration circuit 30. The valve plate 14 is constructed by stacking at least three metal plates. The valve plate 14 has suction ports and discharge ports in association with the individual cylinder bores 11a. The valve plate 14 further has inlet valves 14a, which are flapper valves, corresponding to the individual suction ports and discharge valves 14b, which are flapper valves, corresponding to the individual discharge ports. When the piston 21 moves from the top dead center to the bottom dead center, the refrigerant gas in the suction chamber 25 pushes the inlet valve 14a open and flows into the cylinder bore 11a. When the piston 21 moves from the bottom dead center to the top dead center, the refrigerant gas in the cylinder bore 11a is compressed to a predetermined pressure and pushes the discharge valve 14b open from the discharge port and is discharged into the discharge chamber 26.

A supply passage 23, which connects the crank chamber 15 to the discharge chamber 26, is provided in the cylinder block 11, the valve plate 14 and the rear housing 13. Located in the supply passage 23 is a displacement control valve 24, which is incorporated into the rear housing 13. The displacement control valve 24 is, for example, an electromagnetic valve having a solenoid 24a, a valve body 24b and a port 24c. The port 24c constitutes a part of the supply passage 23. The controller 34 supplies a current to the solenoid 24a. When the solenoid 24a is excited, the valve body 24b closes the port 24c, and when the solenoid 24a is deexcited, the valve body 24b opens the port 24c.

A support hole 11b which supports the rear end of the drive shaft 16 is formed in nearly the center of the cylinder block 11. A pressure-release passage 16a is formed in the drive shaft 16 to extend along the axis L. The pressure-release passage 16a has an inlet, which opens into the crank chamber 15, and an outlet, which opens into the support hole 11b. The support hole 11b is connected to the suction chamber 25 via a restriction hole 27, which passes through the cylinder block 11 and the valve plate 14. The pressure-release passage 16a, the support hole 11b and the restriction hole 27 serve as a bleeding passage for allowing the refrigerant gas in the crank chamber 15 to escape into the suction chamber 25.

The discharge displacement of the compressor 10 is changed by adjusting the pressure in the crank chamber 15 (crank pressure) with the displacement control valve 24. Specifically, as the controller 34 controls the current supply to the control valve 24, the position of the control valve 24 is adjusted. As a result, the relationship between the amount of the gas that is supplied into the crank chamber 15 from the discharge chamber 25 via the supply passage 23 and the amount of gas that flows into the suction chamber 26 from the crank chamber 15 via the bleeding passage changes, thus adjusting the crank pressure.

When the crank pressure rises, the inclination angle of the swash plate 19 becomes smaller and the stroke of each piston 21 becomes smaller, thus reducing the discharge displacement. When the crank pressure becomes lower, on the other hand, the inclination angle of the swash plate 19 becomes larger and the stroke of each piston 21 becomes larger, thus increasing the discharge displacement.

The controller 34 determines the level of the cooling load in a vehicle based on detection information from various sensors (not shown), including a temperature sensor provided on the evaporator 33, and controls the current supply to the control valve 24 in accordance with the cooling load. Consequently, the angle of the control valve 24 changes and the crank pressure or the inclination angle of the swash plate 19 is determined in accordance with the inclination angle, so that the discharge displacement of the compressor 10 is adjusted to match the cooling load. As apparent from the above, the discharge displacement (compression performance) undergoes feedback control based on the control of the inclination angle of the swash plate 19 according to a change in cooling load.

As shown in FIG. 1, the maximum inclination angle of the swash plate 19 is restricted when a stopper 19a provided on the swash plate 19 abuts against the lug plate 18. In addition, the minimum inclination angle of the swash plate 19 is restricted as the swash plate 19 abuts on a restriction ring 28 provided on the drive shaft 16. In general, the minimum inclination angle is set slightly larger than 0° so that the stroke of the piston 21 does not become zero.

The power transmission mechanism provided in the compressor 10 will now be described. As shown in FIGS. 1, 2(A) and 2(B), a support cylinder 41 extends from the front end of the front housing 12. An angular bearing 42 is provided around the support cylinder 41. A pulley 43, or a first rotary body, is fixed to the outer race of the angular bearing 42. Therefore, the pulley 43 is supported to rotate with respect to the support cylinder 41. The pulley 43 is coupled to a vehicular engine 35, or a drive source, via a power transmission belt 44, such as a V belt. The pulley 43 has a boss 43a, which is attached to the outer race of the angular bearing 42, an outer ring 43b, on which the belt 44 is wrapped, a disc portion 43c, which connects the boss 43a to the outer ring 43b. An annular recess (or an annular groove) 46 is located in the area bounded by the boss 43a, the outer ring 43b and the disc portion 43c.

A receiving member 50 is fixed to the front end of the drive shaft 16 by a bolt 47. Therefore, the drive shaft 16 and the receiving member 50 rotate together. The drive shaft 16 and the receiving member 50 form a second rotary body.

FIG. 3 shows the cross section of the receiving member 50 along the line 3—3 in FIG. 2(A). As shown in FIGS. 2(A), 2(B) and 3, the receiving member 50 has a cylinder portion 51, which is fitted over the outer surface of the front end of the drive shaft 16, and a pair of plate arm portions 52, which extend from the outer end portion of the cylinder portion 51 in the radial direction. The plate arm portions 52 are arranged linearly, on opposite sides of the bolt 47. That is, the pair of plate arm portions 52 are angularly spaced apart by 180° about the axis of the receiving member 50. A step portion 52a is formed at the distal end of each plate arm portion 52.

The receiving member 50 further has a pair of ribs 53 that extend in the radial direction. The ribs 53 constitute engagement means. The pair of ribs 53 is provided in association with the pair of plate arm portions 52. The ribs 53 are each provided on the bottom surface of the associated plate arm portion 52.

As shown in FIG. 2(A), the distal end (the outermost end in the radial direction) of each rib 53 extends to the position of the outer surface of the boss 43a of the pulley 43. In other words, the distance from the axial center of the receiving member 50 to the distal end of the rib 53 coincides with the radius of the outermost periphery of the boss 43a.

As shown in FIGS. 2(A) and 2(B), a limit spring 60 as coupling means is placed around the boss 43a of the pulley 43. The limit spring 60 comprises first and second torsion coil springs 601 and 602. Both coil springs 601 and 602 are made of metal. Each of the coil springs 601, 602 has a body portion 61 formed in a helical shape and a first end portion 62 and a second end portion 63, which are located at the ends of the body portion 61. In FIG. 5, only one of the coil springs 601 and 602 is shown.

As shown in FIGS. 2(A) and 5, the first and second end portions 62 and 63 of each torsion coil spring 601, 602 are positioned outside the helical cylinder that the body portion 61 defines. As shown in FIGS. 2(A) and 2(B), each first end portion 62 is fixed by rivets to the disc portion 43c at a corner portion which is formed by the inner surface of the outer ring 43b of the pulley 43 and the disc portion 43c. Each second end portion 63 is fixed to the step portion 52a of the plate arm portion 52 of the receiving member 50 by rivets.

The body portion 61 of each of the torsion coil springs 601, 602 is held between the outer surface of the boss 43a and the inner surface of the outer ring 43b without contacting them. That is, with the first and second end portions 62 and 63 respectively fixed to the disc portion 43c and the plate arm portion 52, the radius of the helical cylinder defined by the body portion 61 is set in such a way as to be greater than the radius of the outer surface of the boss 43a and smaller than the inside diameter of the outer ring 43b. The outside diameter of the cylindrical boss 43a is smaller than at least the diameter of each of the coil springs 601, 602 in the normal state.

Figure 6:
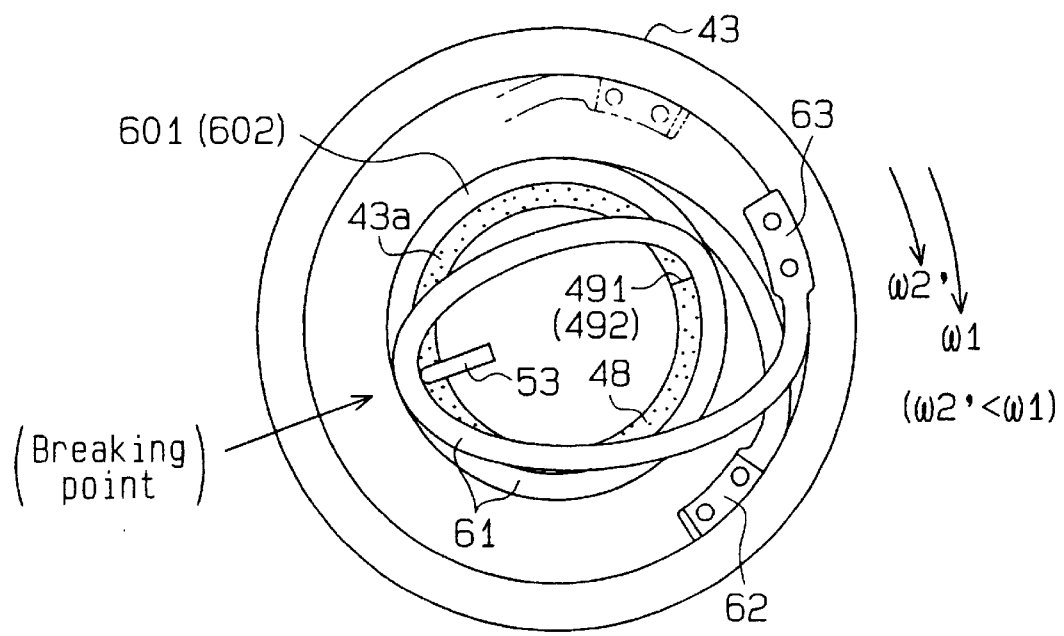
FIG. 6 is an explanatory diagram showing the state of the coil spring immediately before breaking.

Each body portion 61 is wound around the boss 43a approximately two and half helical turns. Note that the portion of the body portion 61 that faces the outer surface of the boss 43a ranges from the first end portion 62 to about one and half turns to about two turns, and the remaining portion close to the second end portion 63 (about one turn to about a half turn) is located forward of the distal end of the boss 43a, as shown in FIG. 2(B). That is, the limit spring 60 has a first portion (rear half) arranged around the boss 43a to face the boss 43a in the radial direction and a second portion (front half) which does not face the boss 43a in the radial direction. The ribs 53 of the receiving member 50 are also located forward of the distal end of the boss 43a. In FIGS. 2(A), 5 and 6, the annular end face 48 of the distal end of the boss 43a has a flecked pattern to help understand the drawings.

As shown in FIGS. 4(A), 4(B) and 5, the annular end face 48 is provided with engagement projections 491 and 492 (only one of the engagement projections 491 and 492 is shown in FIG. 5). The engagement projections 491 and 492 are formed to extend from the annular end face 48. The engagement projections 491 and 492 are located at positions of 180° from each other about the axis of the boss 43a. The first engagement projection 491 is associated with the coil spring 601 and the second engagement projection 492 is associated with the coil spring 602.

For example, the first coil spring 601 has a layout relation with the first engagement projection 491 and one of the ribs 53 as shown in FIG. 5 with the end portions 62 and 63 fixed to the pulley 43 and the receiving member 50. FIG. 6 shows the state in which the first coil spring 601 is on the verge of breaking as a result of relative rotation between the pulley 43 and the receiving member 50 caused by excess load torque generated in the inner mechanism of the compressor. At this time, the first engagement projection 491 and the rib 53 are arranged opposite to each other (angularly separated by almost 180°). The second coil spring 602, the second engagement projection 492 and the rib 53, which works in cooperation with the projection 492, have a layout relationship similar to that described above.

Each of the engagement projections 491 and 492 serves as a hook portion to prevent a part of the spring wound around the outer surface of the boss 43a from coming off that outer surface when the diameter of the associated coil spring 601, 602 is reduced.

As shown in FIG. 2(A), the end portions 62 and 63 of the torsion coil spring 601 and those of the torsion coil spring 602 are located at angularly separated positions different from each other by approximately 180° about the bolt 47. The torsion coil springs 601 and 602 are joined to constitute the single limit spring 60. Therefore, the limit spring 60 serves as a double torsion coil spring having two wires wound to be parallel to each other.

As shown in FIG. 2(B), the rear half of the limit spring 60 is retained in the annular recess 46 of the pulley 43, and the front half of the limit spring 60 is exposed outside of the annular recess 46. The limit spring 60 is located, compressed in the axial direction, between the disc portion 43c of the pulley and the receiving member 50. Therefore, the restoring force of the limit spring 60 urges the receiving member 50 and the drive shaft 16 forward.

As apparent from the above, the pulley 43 is coupled to the receiving member 50 and the drive shaft 16 in a power transmittable manner via the limit spring 60, which includes two torsion coil springs 601 and 602. The limit spring 60 therefore serves as a coupling means that couples the first rotary body and the second rotary body in a synchronously rotatable manner.

The operation of this embodiment will now be discussed with reference to FIGS. 5 to 7. Note that FIGS. 5 and 6 omit the receiving member 50 and show only one of the two coil springs 601 and 602 for easier understanding.

The power of the engine 35 is normally transmitted to the drive shaft 16 via the belt 44, the pulley 43, the limit spring 60 (torsion coil springs 601 and 602) and the receiving member 50. That is, the supply torque of the engine 35 is balanced with the load torque of the compressor 10, and the pulley 43 and the drive shaft 16 synchronously rotate with the angular velocity $\omega 1$ of the pulley 43, which is equal to the angular velocity $\omega 2$ of the receiving member 50, and the drive shaft 16 as shown in FIG. 5. In this case, the body portion 61 of each torsion coil spring 601, 602 is kept separated from the outer surface of the boss 43a of the pulley.

In accordance with the power transmission to the drive shaft 16, the swash plate 19 coupled to the drive shaft 16 causes the individual pistons 21 to reciprocate. The pistons 21 perform suction and compression of the refrigerant gas. In accordance with this work (load condition), a load torque in the opposite direction to the rotational direction of the pulley 43 acts on the drive shaft 16 and the receiving member 50. If the load torque does not exceed a predetermined limit value and is not large enough to impart an undesirable influence on the engine 35, however, the power transmission to the receiving member 50 and the drive shaft 16 from the pulley 43 via both coil springs 601 and 602 is maintained. As long as this power transmission is maintained, even if the load torque varies under the predetermined limit value due to a phase shift of the pressure change in each cylinder bore 11a, a variation in the compression load or the like, such a variation in load torque is sufficiently accommodated by the spring elasticity of the coil springs 601 and 602.

When some kind of problem (e.g., seizure) occurs inside the compressor and the load torque of the compressor 10 exceeds the predetermined limit value, on the other hand, a difference between the angular velocity $\omega 1$ of the pulley 43 and the angular velocity $\omega 2$ of the receiving member 50 and the drive shaft 16 (see FIG. 6; $\omega 2' < \omega 1$) occurs. That is, the pulley 43 and the receiving member 50 and the drive shaft 16 do not rotate synchronously. Specifically, while the first end portions 62 of the coil springs 601 and 602 coupled to the pulley 43 try to stay in synchronous rotation with the pulley 43, the second end portions 63 coupled to the receiving member 50 strongly resist synchronous rotation with the pulley 43, producing an angular velocity difference ($\omega 1 - \omega 2'$) between the ends 62 and 63.

This angular velocity difference deforms each coil spring 601, 602 such that its diameter decreases. As a result, as shown in FIG. 6, the rear half of the body portion 61 of the coil spring 601 (or 602) is wound around the outer surface of the boss 43a of the pulley 43 tightly and a part of the front half of the body portion 61 abuts against the distal end of the rib 53. When the rear half of the body portion 61 is wound around the outer surface of the boss 43a, further deformation is restricted.

Based on the angular velocity difference between the pulley 43 and the receiving member 50, the engagement projection 491 (or 492) is positioned as shown in FIG. 6 with respect to the rib 53. As twisting is further applied to each of the coil springs 601, 602 in the direction of reducing its diameter, the boundary portion between the front half and the rear half of the body portion 61 is bent inward of the cylinder defined by the outer surface of the boss 43a at the engagement projection 491 (or 492) and the portion of the body portion 61 that is in contact with the rib 53 is further bent sharply. As a result, stress due to the twisting of each of the coil springs 601, 602 concentrates particularly at the portion in contact with the rib 53, so that the body portion 61 finely breaks at that location.

This embodiment uses two coil springs 601 and 602, and if one coil spring breaks, all the load torque is applied to the remaining coil spring so that the remaining coil spring breaks immediately. When an excess load torque that exceeds a predetermined limit value is produced, both coil springs 601 and 602 break almost simultaneously, so that power transmission to the drive shaft 16 from the engine 35 is positively discontinued.

Figure 7:
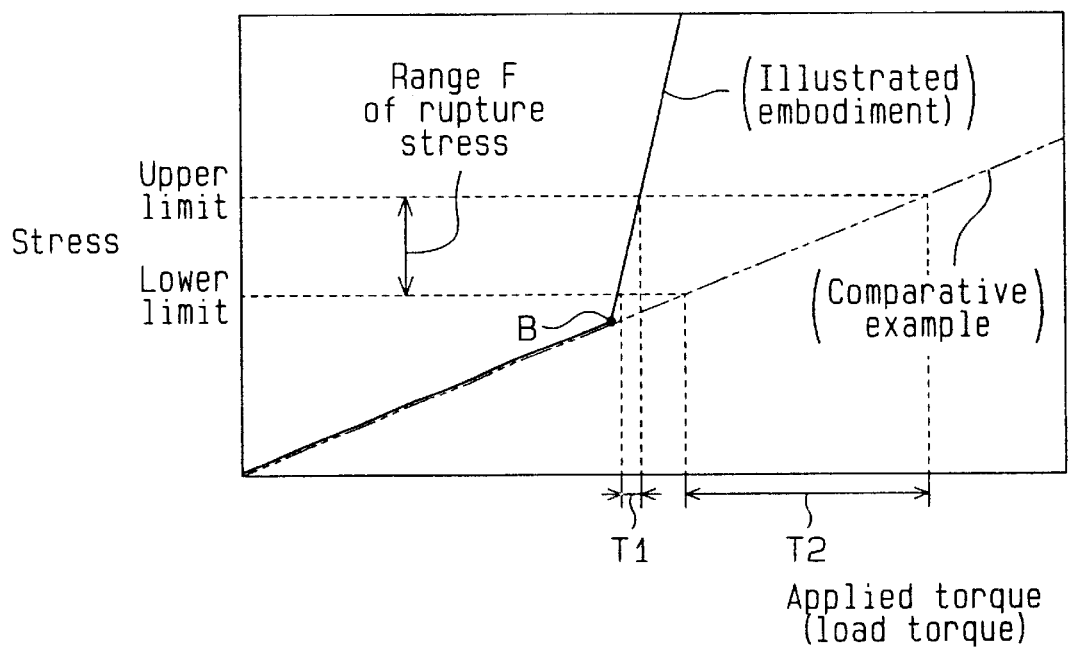
FIG. 7 is a graph illustrating the relationship between the load torque of a compressor and stress which acts on a limit spring.

FIG. 7 is a graph illustrating the relationship between the torque applied to the limit spring 60 (coil springs 601, 602) from the compressor (i.e., load torque) and the stress that acts on the limit spring 60. In this graph, the solid line indicates the characteristics of the power transmission mechanism according to this embodiment, and the two-dot chain line indicates the characteristics of a comparative example equivalent to the structure of the power transmission mechanism of this embodiment except that the pair of ribs 53 and the pair of engagement projections 491 and 492 are not present. Because the coil springs in use in both cases are the same, a range F from the upper limit to the lower limit of the stress (rupture stress) that is needed to break the body portion 61 is the same in both cases.

Since the line representing the characteristics of the comparative example has the same slope over the entire range of the applied torque, a range T2 of the applied torque corresponding to the rupture stress range F also becomes relatively wide as shown in FIG. 7. In contrast, the slope of the line representing the characteristics of this embodiment suddenly increases at a transition point B. That is, the transition point B indicates the time when the body portion 61 contacts the distal end of the rib 53. In the range of the applied torque before the transition point B, the body portion 61 and the rib 53 are not in contact with each other, and the slope of the characteristic line does not differ between this embodiment and the comparative example.

In this embodiment, after the body portion 61 contacts the distal end of the rib 53, however, the stress caused by the load torque concentrates at the point of contact with the rib 53 so that the stress tends to rise sharply from there. Since the aforementioned rupture stress range F corresponds to the torque range after the transition point B where the slope of the characteristic line is large, the range T1 for the applied torque corresponding to that stress range F is relatively narrow (T1<T2). Therefore, that the range of the load torque for breaking the spring is narrower in this embodiment than in the comparative example and power transmission can positively be cut off when the load torque of the compressor approximately reaches the expected limit value (i.e., the break-expected torque).

This embodiment has the following effects.

The provision of the ribs 53 narrows the range T1 of the load torque corresponding to the rupture stress range F of both coil springs 601 and 602 so that the coil springs 601 and 602 can be broken with certainly at the load torque at which breaking is expected, thus adequately accomplishing power cutoff. It is therefore possible to guarantee protection of the engine 35 or the like against excess load torque.

Until the load torque of the compressor reaches the break-expected torque, the rear half of the twisted coil springs 601, 602 are be wound around the outer surface of the boss 43a. During this period, each of the coil springs 601, 602 and the boss 43a rotate synchronously, so that there is no abnormal sound produced by the winding, and no wear or the like occurs between the coil springs 601, 602 and the boss 43a.

When the coil springs 601, 602 are twisted further by the load torque from the state where the rear half of the coil springs 601, 602 are wound around the outer surface of the boss 43a, a part of each coil spring 601, 602 is hooked on the associated engagement projection 491, 492 of the boss 43a and is further bent there. The presence of the engagement projection 491, 492 as a hook prevents the rear halves of the coil springs 601, 602, which are wound around the outer surface of the boss 43a from coming off the boss 43a when twisting is further applied. Therefore, the twisting action caused by the load torque on the front halves of the coil springs 601, 602, which are located in front of the boss 43a, is concentrated, so that even a slight increase in load torque increases the amount of deformation of the coil spring 601, 602 at the point where the rib 53 makes contact. In this sense, the engagement projections 491 and 492 are means for aiding the breaking action of the ribs 53.

The limit spring 60 includes a plurality of coil springs 601, 602. The end portions 62 and 63 of the coil spring 601 and those of the coil spring 602 are coupled to other members at equal angular distances (i.e., angular positions different by 180°). During power transmission from the engine 35, therefore, a moment that tilts the drive shaft 16 with respect to the axis L is not produced and the rotation of the receiving member 50 and the drive shaft 16 is stable, and torque is transmitted efficiently. Since the two torsion coil springs 601 and 602 support each other, the postures of the coil springs 601 and 602 are stable when the two coil springs 601 and 602 are combined.

If a design that allows the first end portion 62 of each coil spring 601, 602 to be engageable with and disengageable from the inner surface portion of the outer ring 43b of the pulley 43 is employed, wear may occur at the engagement location. Because both end portions 62 and 63 of each coil spring are secured to the respective members in this embodiment, by way of contrast, there is no need to consider wear.

Since the metal coil springs 601 and 602 are means that couples the first rotary body and the second rotary body, it is possible to set the spring constant of the limit spring 60 considerably low (more specifically, lower than the spring constant of an ordinary rubber damper). This makes it possible to set the resonance frequency of the power transmission system lower than the minimum frequency of a variation in the load torque that occurs in the compressor 10, or the driven machine. It is therefore possible to reduce noise and abnormal vibration due to resonance based on the load torque variation and to prevent the inner mechanism of the compressor 10 from being damaged(see Japanese Patent Application No. Hei 9-30075 filed by the present applicant for more details).

Unless the load torque produced by the compressor exceeds a predetermined limit value, variation in the torque that acts on the drive shaft 16 can be suppressed by the twisted deformation of the limit spring 60. That is, the limit spring 60 also serves as a damper.

Because the power transmission mechanism of this embodiment does not require a vibration isolating member such as a rubber cushion, it has fewer components and is simple.

The intervening limit spring 60, which is axially compressed between the pulley 43 and the receiving member 50, also urges the drive shaft 16 together with the receiving member 50 frontward. This suppresses rattling of the drive shaft 16 in the axial direction. It is therefore unnecessary to consider the provision of a special spring member or the like for urging the drive shaft 16 in the axial direction. The limit spring 60 therefore also contributes to simplifying of the compressor 10.

The above-described embodiment may be modified in the following forms.

The portion of the body portion 61 of each coil spring 601, 602 that contacts the rib 53 and its neighboring portion may be quenched by means such as a laser to make that portion harder than the other portions. The increase in hardness of the coil spring 601, 602 makes that portion more susceptible to stress fracture.

Although the portion of each of the coil springs 601, 602 that is closer to the receiving member 50 (part of the front half) is designed to break in the embodiment in FIGS. 1 through 6, the portion of the coil spring 601, 602 that is closer to the pulley (part of the rear half) may be designed to break.

Even if the part of the front half of each coil spring 601, 602 is intended to break, it is unnecessary to make the ribs 53 as a main cutoff member and make the engagement projections 491 and 492 as a break-aiding member. The shapes of the engagement projections 491 and 492 may be changed so that the engagement projections 491 and 492 themselves become a main cutoff member.

The engagement projections 491 and 492 may be omitted.

It is not essential to angularly separate the rib 53 and the engagement projection 491 (or 492) opposite to each other by 180°, sandwiching the axial center of the boss 43a as shown in FIG. 6, when the compressor is overloaded. On the verge of breaking (see FIG. 6), they may have such a layout relation that the angle θ that is formed by the rib 53, the axial center of the boss 43a and the engagement projection 491 (or 492) is less than 180°. However, note that if the angle θ is too small, the cooperative and synergetic effect of the rib 53 and the engagement projection 491, 492 may become low.

The shape of the engagement projection 491, 492 is not limited to the one shown in FIG. 4, but it may be a hook pin protruding from the annular end face 48 of the boss 43a. Alternatively, the hook portion may be protrude from the outer surface of the boss 43a.

One of the two torsion coil springs 601 and 602 may be omitted so that the limit spring 60 is comprised of a single coil spring. Alternatively, the limit spring 60 may be constructed by using three or more coil springs. That is, the limit spring 60 includes at least one coil spring.

The compressor 10 in FIG. 1 may be additionally provided with an electromagnetic clutch.

What is claimed is:

1. An interruptible power transmission mechanism for coupling a drive source to a driven machine comprising:
    a first rotor that is driven by the drive source;
    a second rotor that rotates synchronously with the driven machine;
    a coupler that connects the first rotor to the second rotor; and
    an abutment that contacts the coupler at a contact location when the load torque of the driven machine exceeds a predetermined value, wherein the abutment increases the stress in the coupler at the contact location and promotes breakage of the coupler when the load torque of the driven machine exceeds the predetermined value, wherein the ratio of the change in the stress in the coupler at the contact location to the change of the load torque of the driven machine increases when the abutment contacts the coupler, and wherein the coupler includes an elastic member that deforms in accordance with the load torque of the driven machine.

2. The power transmission mechanism of claim 1, wherein the abutment resists deformation of the coupler in an inward radial direction at the contact location.

3. The power transmission mechanism of claim 1, wherein the coupler includes a coil spring.

4. The power transmission mechanism of claim 3, wherein the coil spring is axially compressed.

5. The power of transmission mechanism of claim 3, wherein the radius of the coil spring changes in accordance with the load torque of the driven machine.

6. The power transmission mechanism of claim 3, wherein the first rotor includes a pully and a boss, and the coil spring has a first section that surrounds the boss and a second section that extends beyond the boss, wherein the contact point is located on the second section.

7. The power transmission mechanism of claim 6, wherein the first section wraps around the boss and the abutment engages the second section when the load torque of the driven machine exceeds the predetermined value.

8. The power transmission mechanism of claim 7, wherein the boss includes a hook portion for engaging the coil spring when the load torque of the driven machine exceeds the predetermined value.

9. The power transmission mechanism of claim 1, wherein the abutment is a rib formed on the second rotor.

10. The power transmission mechanism of claim 9, wherein the driven machine has a drive shaft and a second rotor includes a member fixed to the drive shaft, and the rib is formed on the member.

11. The power transmission mechanism of claim 1, wherein the coupler includes a plurality of coaxial coil springs, wherein each coil spring has a first end fixed to the first rotor an a second end fixed to the second rotor, and the first ends are spaced apart at equal angular intervals, and the second ends are spaced apart at equal angular intervals.

12. The power transmission mechanism of claim 1, wherein the coupler includes a coil spring, and wherein the abutment is located inside the coil spring.

13. The power transmission mechanism of claim 12, wherein the abutment is fixed to the second rotor.

14. An interruptible power transmission mechanism for coupling a drive source to a driven machine comprising:

a first rotor that is driven by the drive source;

a second rotor that rotates synchronously with the driven machine;

a coupler that connects the first rotor to the second rotor; and an abutment that contacts the coupler at a contact location when the load torque of the driven machine exceeds a predetermined value, wherein the abutment increases the stress in the coupler at the contact location and promotes breakage of the coupler when the load torque of the driven machine exceeds the predetermined value, wherein the ratio of the change in the stress in the coupler at the contact location to the change of the load torque of the driven machine increases when the abutment contacts the coupler, and wherein the abutment resists deformation of the coupler in a inward radial direction at the contact location.

15. An interruptible power transmission mechanism for coupling a drive source to a driven machine comprising:

a first rotor that is driven by the drive source;

a second rotor that rotates synchronously with the driven machine;

a coupler that connects the first rotor to the second rotor, the coupler includes a coil spring, wherein stress in the coupler varies in accordance with the load torque of the driven machine; and an abutment that contacts the coupler at a contact location when the load torque of the driven machine exceeds a predetermined value, wherein the abutment increases the stress in the coupler at the contact location and promotes breakage of the coupler when the load torque of the driven machine exceeds the predetermined value, and the abutment increases the ratio of a change in the stress in the coupler to a change of the load torque in the driven machine.

* * * * *

UNITED STATES PATENT AND TRADEMARK OFFICE
CERTIFICATE OF CORRECTION

PATENT NO.    : 6,419,585 B1
DATED         : July 16, 2002
INVENTOR(S)   : Kazuya Kimura It is certified that error appears in the above-identified patent and that said Letters Patent is hereby corrected as shown below:

<u>Title page, Item [54] and Column 1, line 1,</u>
Please delete "POWER TRANSMISSION MECHANISM" and insert therefore
-- INTERRUPTIBLE POWER TRANSMISSION MECHANISM --;

Item [30], Foreign Application Priority Data, please delete "Dec 4, 1999" and insert therefor -- Dec. 4, 1998 --

<u>Column 7,</u>
Line 22, please delete "velocity $\omega 2$" and insert therefor -- velocity $\omega 2'$ --;

<u>Column 11,</u>
Line 21, please delete "rotor an a second" and insert therefor -- rotor and a second --.

Signed and Sealed this

Fourth Day of February, 2003

JAMES E. ROGAN
*Director of the United States Patent and Trademark Office*